(12) United States Patent
Yamazaki et al.

(10) Patent No.: US 10,876,275 B2
(45) Date of Patent: Dec. 29, 2020

(54) CONSTRUCTION MACHINE

(71) Applicant: KOBELCO CONSTRUCTION MACHINERY CO., LTD., Hiroshima (JP)

(72) Inventors: Yoichiro Yamazaki, Hiroshima (JP); Masayuki Komiyama, Hiroshima (JP); Reona Takamura, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 157 days.

(21) Appl. No.: 16/095,724

(22) PCT Filed: Apr. 25, 2017

(86) PCT No.: PCT/JP2017/016334
§ 371 (c)(1),
(2) Date: Oct. 23, 2018

(87) PCT Pub. No.: WO2017/188230
PCT Pub. Date: Nov. 2, 2017

(65) Prior Publication Data
US 2020/0032489 A1 Jan. 30, 2020

(30) Foreign Application Priority Data

Apr. 28, 2016 (JP) .................................. 2016-090067
Jun. 17, 2016 (JP) .................................. 2016-120614

(51) Int. Cl.
*E02F 9/26* (2006.01)
*G01S 17/931* (2020.01)
(Continued)

(52) U.S. Cl.
CPC ............ *E02F 9/262* (2013.01); *B60R 21/013* (2013.01); *E02F 9/20* (2013.01); *E02F 9/24* (2013.01);
(Continued)

(58) Field of Classification Search
CPC ...... E02F 9/26; E02F 9/20; E02F 9/24; B60R 21/00; G01S 17/93; G05D 1/02
(Continued)

(56) References Cited

U.S. PATENT DOCUMENTS 6,363,632 B1 * 4/2002 Stentz .................... E02F 3/437
37/414
2014/0070982 A1  3/2014 Inada et al.
(Continued)

FOREIGN PATENT DOCUMENTS

CN   102322080 A    1/2012
CN   104067144 A    9/2014
(Continued)

OTHER PUBLICATIONS

Extended European Search Report dated Apr. 11, 2019 in Patent Application No. 17789512.5, 8 pages.
(Continued)

*Primary Examiner* — Tan Q Nguyen
(74) *Attorney, Agent, or Firm* — Oblon, McClelland, Maier & Neustadt, L.L.P.

(57) ABSTRACT

A hydraulic excavator includes a lower travelling body, an upper slewing body, a sensor which detects presence/absence of an obstacle in a monitoring region set around the hydraulic excavator in advance and a distance to the obstacle, a control unit which calculates first position information including positional coordinates of an obstacle relative to a reference position set in advance in the hydraulic excavator on the basis of a detection result obtained by the
(Continued)

sensor, a time counting unit which acquires time information including time when an obstacle is detected, and a storage unit which stores log data correlating the first position information with the time information.

10 Claims, 14 Drawing Sheets

(51) Int. Cl.
*B60R 21/013* (2006.01)
*E02F 9/20* (2006.01)
*E02F 9/24* (2006.01)
*G05D 1/02* (2020.01)
*B60R 21/00* (2006.01)

(52) U.S. Cl.
CPC ............ *G01S 17/931* (2020.01); *G05D 1/021* (2013.01); *B60Y 2200/41* (2013.01)

(58) Field of Classification Search
USPC .......................................................... 701/50
See application file for complete search history.

(56) References Cited

U.S. PATENT DOCUMENTS

| | | | | |
|---|---|---|---|---|
| 2014/0111648 | A1* | 4/2014 | Ishimoto | B60R 1/00 348/148 |
| 2015/0326829 | A1* | 11/2015 | Kurihara | G01S 13/931 348/148 |
| 2015/0343976 | A1* | 12/2015 | Lim | G01S 15/931 340/435 |
| 2017/0146343 | A1* | 5/2017 | Matsuo | H04N 13/128 |
| 2018/0051446 | A1* | 2/2018 | Yoshinada | B60R 1/00 |

FOREIGN PATENT DOCUMENTS

| | | | |
|---|---|---|---|
| JP | 7-207712 | A | 8/1995 |
| JP | 2001-51057 | A | 2/2001 |
| JP | 2002-290596 | A | 10/2002 |
| JP | 2005-275723 | A | 10/2005 |
| JP | 2006-307436 | A | 11/2006 |
| JP | 2007-323117 | A | 12/2007 |
| JP | 2008-163719 | A | 7/2008 |
| JP | 2010-211613 | A | 9/2010 |
| JP | 2012-225732 | A | 11/2012 |
| WO | WO 2012/144150 | A1 | 10/2012 |
| WO | WO 2015/198410 | A1 | 12/2015 |

OTHER PUBLICATIONS

International Search Report dated Jun. 20, 2017 in PCT/JP2017/016334 filed Apr. 25, 2017.

Combined Chinese Office Action and Search Report dated Aug. 31, 2020 in Chinese Patent Application No. 201780025289.4 (with English Summary of Office Action and English translation of Category of Cited Documents), 8 pages.

* cited by examiner

FRONT ←——→ REAR

FIG. 11

| time | RELATIVE POSITIONAL COORDINATES | GPS POSITIONAL COORDINATES | WORK STATE |
|---|---|---|---|
| ⋮ | ⋮ | ⋮ | ⋮ |
| ::** | (x1, y1, z1) | (X1, Y1, Z1) | DURING STOP |
| ::** | (x2, y2, z2) | (X2, Y2, Z2) | DURING STOP |
| ⋮ | ⋮ | ⋮ | ⋮ |

TB

CONSTRUCTION MACHINE

TECHNICAL FIELD

The present invention relates to a construction machine which stores information about an obstacle positioned around the construction machine.

BACKGROUND ART

There has been conventionally proposed a monitoring mobile body capable of detecting position information of a foreign object for safety management of roads (e.g. Patent Literature 1). The monitoring mobile body is equipped with a foreign object detection sensor which detects an obstacle on a road surface, and the like. Specifically, the monitoring mobile body is equipped with a positioning unit which outputs travelling position information of the mobile body, a foreign object detection sensor which monitors a foreign object on a road surface to acquire foreign object detection information, and a foreign object position computing unit which detects foreign object position information from the travelling position information and the foreign object detection information.

However, in some work sites where a construction machine is used, a worker may work in proximity to the surroundings of the construction machine, or an upper slewing body may approach various kinds of structures due to turning of the upper slewing body. In this case, it is preferable to detect, as an obstacle, a worker around the construction machine or various kinds of structures which come closer to an upper slewing body due to turning of the upper slewing body. In this respect, by using the technique recited in Patent Literature 1, it is possible to detect a position of an obstacle in a construction machine.

However, there is a case where at a work site where a construction machine is used, a worker works around a working machine in a specific time zone, and in such a case, safety is improved if it can be grasped in which time zone and at which position an obstacle has been detected.

CITATION LIST

Patent Literature

Patent Literature 1: JP 2005-275723 A

SUMMARY OF INVENTION

An object of the present invention is to provide a construction machine capable of grasping not only a position of an obstacle but also a time zone in which the obstacle is detected.

In order to solve the above-described problem, the present invention aims at providing a construction machine including a lower travelling body; an upper slewing body provided on the lower travelling body to be turnable with respect to the lower travelling body; an obstacle detection sensor which detects presence/absence of an obstacle in a monitoring region set around the construction machine in advance and a distance to the obstacle; a first calculation portion which calculates first position information including positional coordinates of the obstacle relative to a reference position set in the construction machine in advance based on a detection result obtained by the obstacle detection sensor; a time information holding portion which has time information for specifying time when the obstacle is detected; and a storage unit which stores log data that correlates the first position information with the time information.

According to the present invention, not only a position of an obstacle but also a time zone where the obstacle is detected can be grasped because time when the obstacle is detected and a position of the obstacle relative to a reference position of a construction machine are stored so as to be correlated with each other.

Additionally, the construction machine according to the present invention is suitable for a hydraulic excavator which stores information about an obstacle in proximity to the surroundings of the machine.

BRIEF DESCRIPTION OF DRAWINGS

FIG. 11 is a diagram showing one example of a log data table.

DESCRIPTION OF EMBODIMENTS

In the following, an embodiment of the present invention will be described with reference to the accompanying drawings. The embodiment described below is one example of implementation of the present invention, but does not limit a technical range of the present invention.

Figure 1:
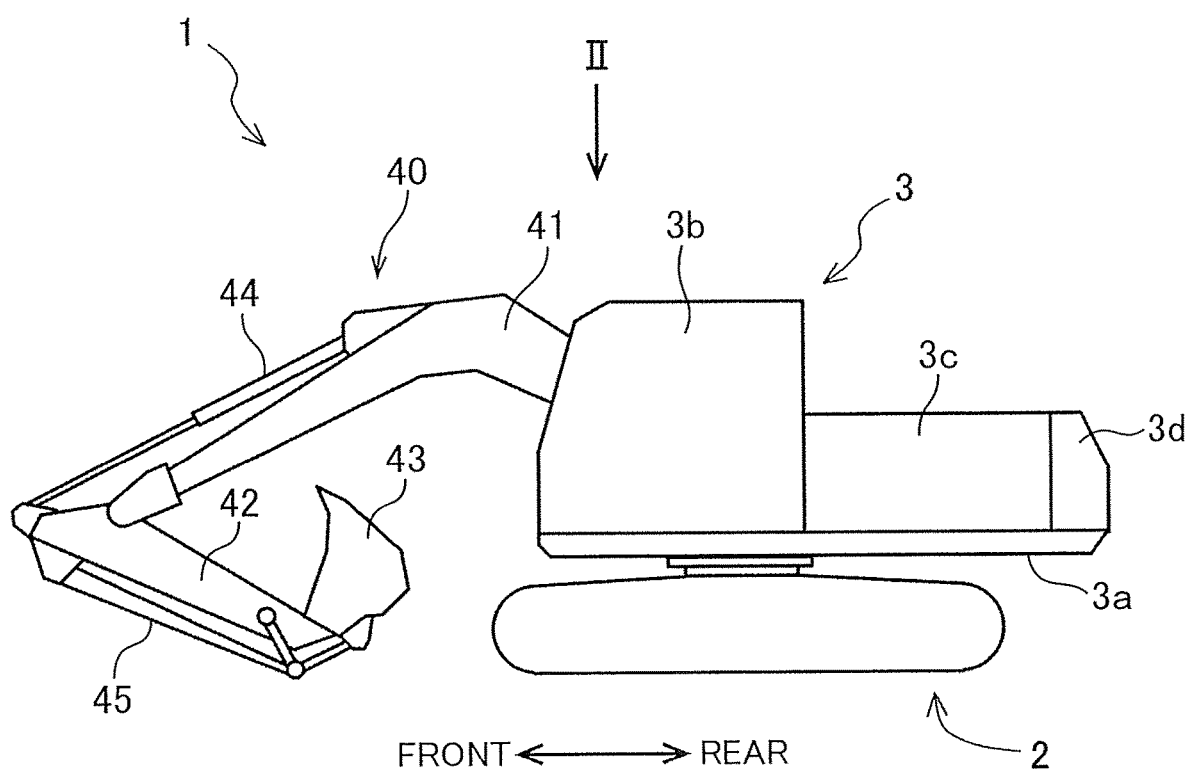
FIG. 1 is a side view showing a hydraulic excavator according to an embodiment of the present invention.

A construction machine according to the embodiment of the present invention will be described on the basis of FIG. 1 to FIG. 12. In the following, a hydraulic excavator 1 shown in FIG. 1 is illustrated as the construction machine according to the present invention. In each drawing, a front-rear direction and a right-left direction of the machine are appropriately defined as required.

As shown in FIG. 1, the hydraulic excavator 1 is equipped with a crawler-type lower travelling body 2, an upper slewing body 3 provided on the lower travelling body 2 in a state of being turnable around a vertical axis with respect to the lower travelling body 2, and an attachment 40 attached to the upper slewing body 3 so as to be capable of moving up and down.

The attachment 40 includes a boom 41 having a base end portion attached to the upper slewing body 3 so as to be movable around a horizontal axis, an arm 42 having a base end portion attached to a distal end portion of the boom 41 so as to be movable around the horizontal axis, and a bucket 43 attached to a distal end portion of the arm 42 so as to be movable around the horizontal axis.

The attachment 40 further includes a boom cylinder (not shown) which causes the boom 41 to move with respect to the upper slewing body 3, an arm cylinder 44 which causes the arm 42 to move with respect to the boom 41, and a bucket cylinder 45 which causes the bucket 43 to move with respect to the arm 42.

Figure 2:
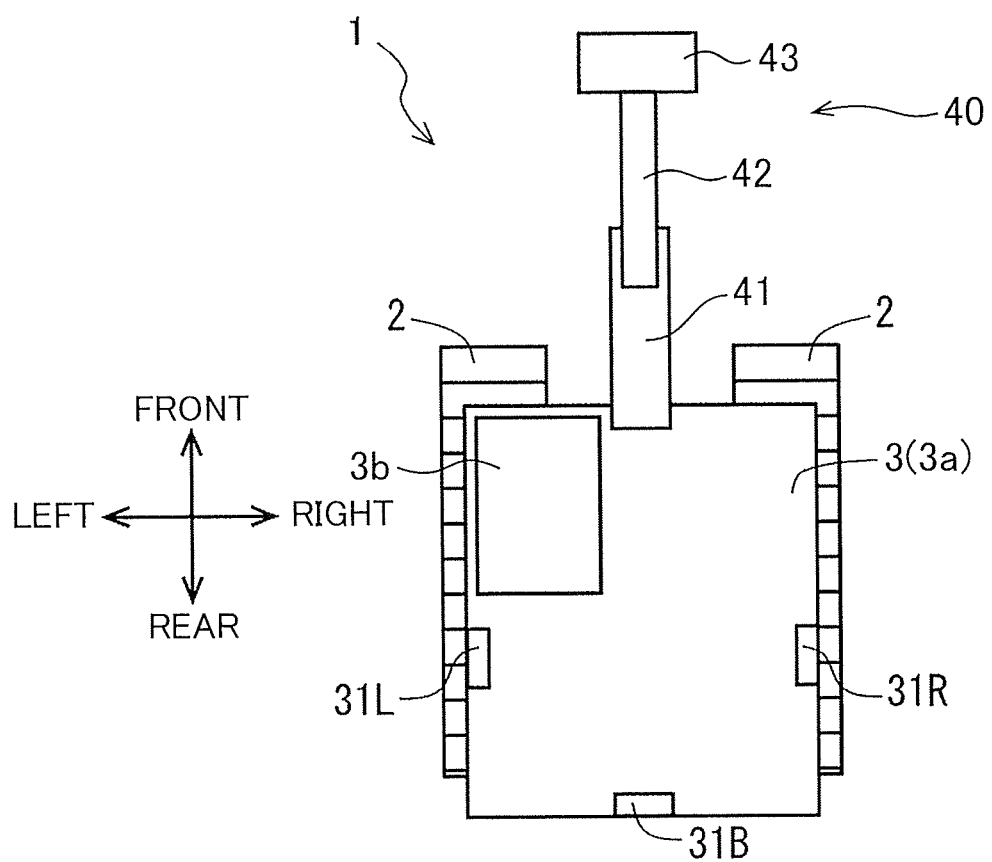
FIG. 2 is a view (plan view) seen from an arrow II of FIG. 1.

The upper slewing body 3 has a slewing frame 3a turnably attached on the lower travelling body 2, a cabin 3b provided on the slewing frame 3a, a guard 3c which covers equipment provided on the slewing frame 3a such as an engine, and a counter weight 3d provided on a rear portion of the slewing frame 3a. In a front portion of the slewing frame 3a, the attachment 40 is attached to be capable of moving up and down. In FIG. 2, illustration of the guard 3c and the counter weight 3d is omitted.

As shown in FIG. 2, the upper slewing body 3 is equipped with a left side sensor 31L, a right side sensor 31R, and a rear side sensor 31B. The left side sensor 31L is provided along a left side surface of the upper slewing body 3. Specifically, the left side sensor 31L is attached to the stewing frame 3a in a state of having a detection region thereof facing to the left side. The right side sensor 31R is provided along a right side surface of the upper slewing body 3. Specifically, the right side sensor 31R is attached to the slewing frame 3a in a state of having a detection region thereof facing to the right side. The rear side sensor 31B is provided along a rear side surface of the upper slewing body 3. Specifically, the rear side sensor 31B is attached to the slewing frame 3a in a state of having a detection range thereof facing to the rear side.

The sensors 31L, 31R, and 31B are all three-dimensional distance measuring sensors (distance sensors), which calculate a distance on the basis of time of reciprocation of an infrared laser projected onto a target object. The detection region of each of the sensors 31L, 31R, and 31B is defined by a region (an angle of view) irradiated with an infrared laser and by a distance as a detection target of each of the sensors 31L, 31R, and 31B. The sensors 31L, 31R, and 31B are capable of detecting, as an obstacle, something present at a distance different from a certain distance as a reference, if any. For example, it is possible to detect, as an obstacle, something present at a distance closer or farther than a reference distance, which is a distance from each of the sensors 31L, 31R, and 31B to the ground, in a situation where the ground is irradiated with an infrared laser. It is also possible to detect, as an obstacle, something present at a distance closer to a reference distance, which is a detection target of each of the sensors 31L, 31R, and 31B, in a situation where an infrared laser is radiated in a horizontal direction. In other words, each of the sensors 31L, 31R, and 31B is one example of an obstacle detection sensor having a detection region in which presence/absence of an obstacle and a distance to the obstacle can be detected.

Figure 3:
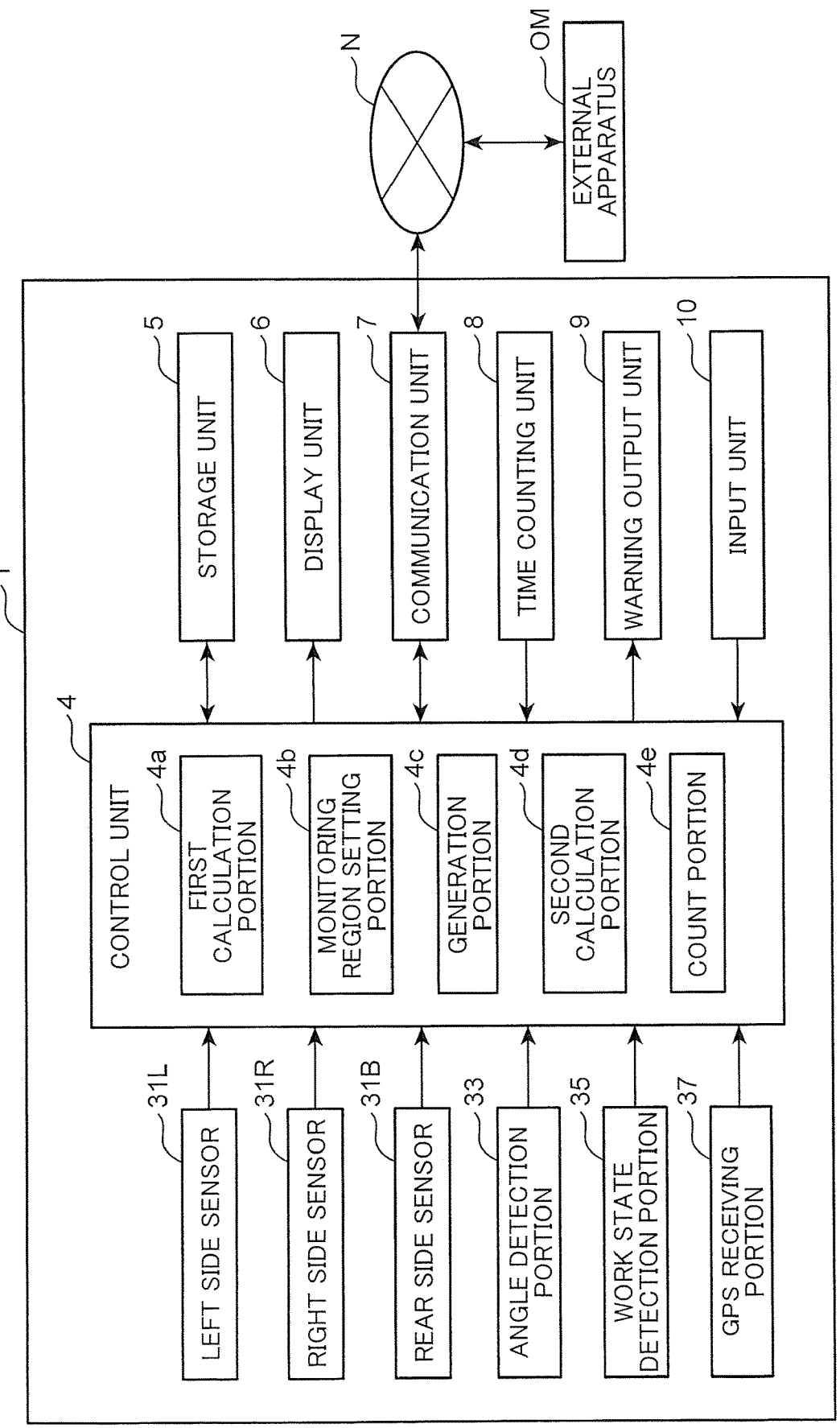
FIG. 3 is a functional block diagram including a control unit of the hydraulic excavator.

FIG. 3 is a block diagram showing an electrical configuration provided in the hydraulic excavator 1 of FIG. 1.

As shown in FIG. 3, the hydraulic excavator 1 further includes an angle detection portion 33, a work state detection portion 35, and a GPS receiving portion 37 in addition to the sensors 31L, 31R, and 31B.

Figure 4:
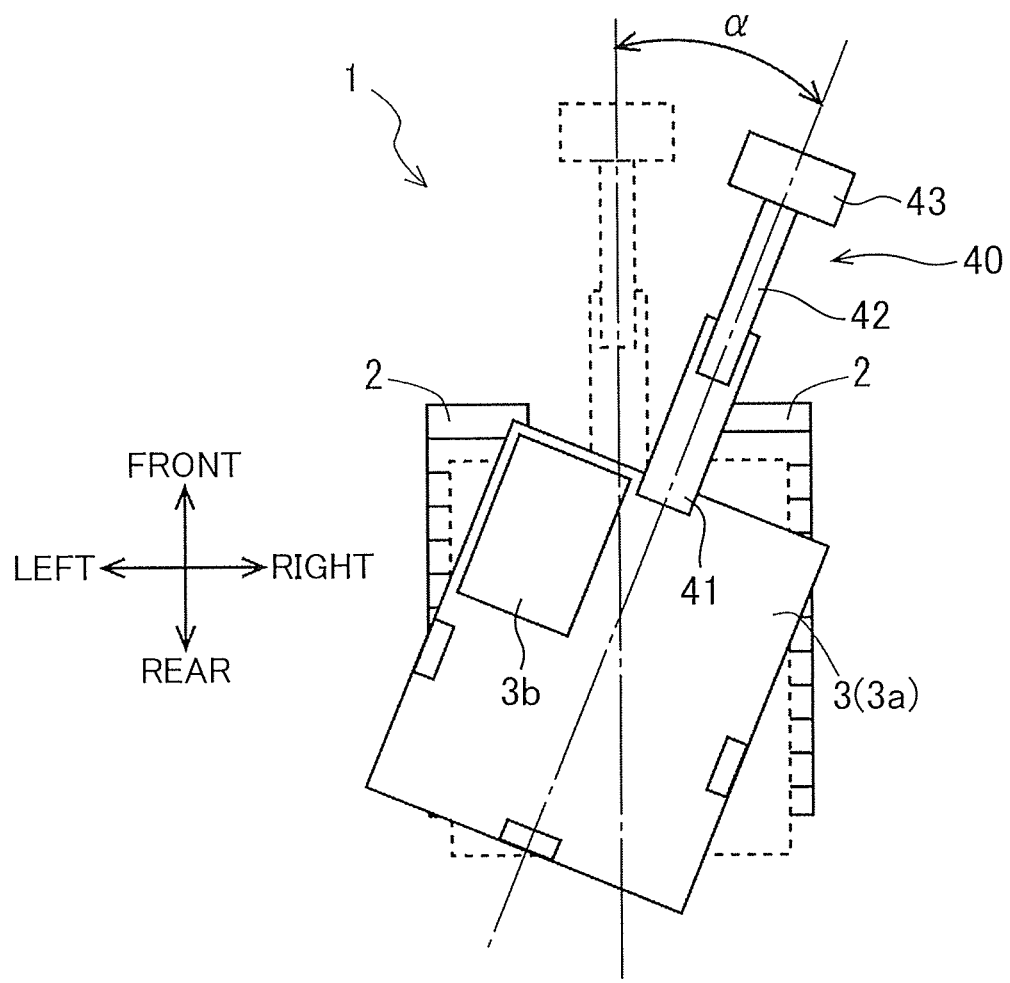
FIG. 4 is a plan view of a hydraulic excavator 1 for explaining an angle formed by a lower travelling body and an upper slewing body.

As shown in FIG. 4, the angle detection portion 33 is capable of detecting a relative angle α between the lower travelling body 2 and the upper slewing body 3 in a turning direction of the upper slewing body 3. The angle detection portion 33 can be formed with, for example, a rotary encoder or a gyro sensor.

The work state detection portion 35 detects whether the hydraulic excavator 1 is in a state of "in work" or "during stop". Specifically, the work state detection portion 35 detects, for example, the hydraulic excavator 1 at idling (a state where the attachment 40 is not in operation for a fixed time period) as being in a work state of "during stop", and detects the hydraulic excavator 1 in other states as being in a work state of "in work". The work state detection portion 35 can be formed with, for example, a sensor which detects an operation state of a getting on/off blocking lever that brings the attachment 40 into an inoperable state by operation by an operator, or a sensor which detects an inoperable state of an operation lever for the attachment 40.

The GPS receiving portion 37 receives, from a GPS (Global Positioning System) satellite, information for specifying second position information including positional coordinates (second positional coordinates CP2 to be described later) of a reference position RP (see FIG. 10) set in the hydraulic excavator 1 in advance. Specifically, the GPS receiving portion 37 calculates positional coordinates of the reference position RP on the basis of a plurality of signals received from a plurality of GPS satellites (three-dimensional positioning).

As shown in FIG. 3, the hydraulic excavator 1 is further equipped with a control unit 4, a storage unit 5, a display unit 6, a communication unit 7, a time counting unit 8, a warning output unit 9, and an input unit 10.

Figure 9:
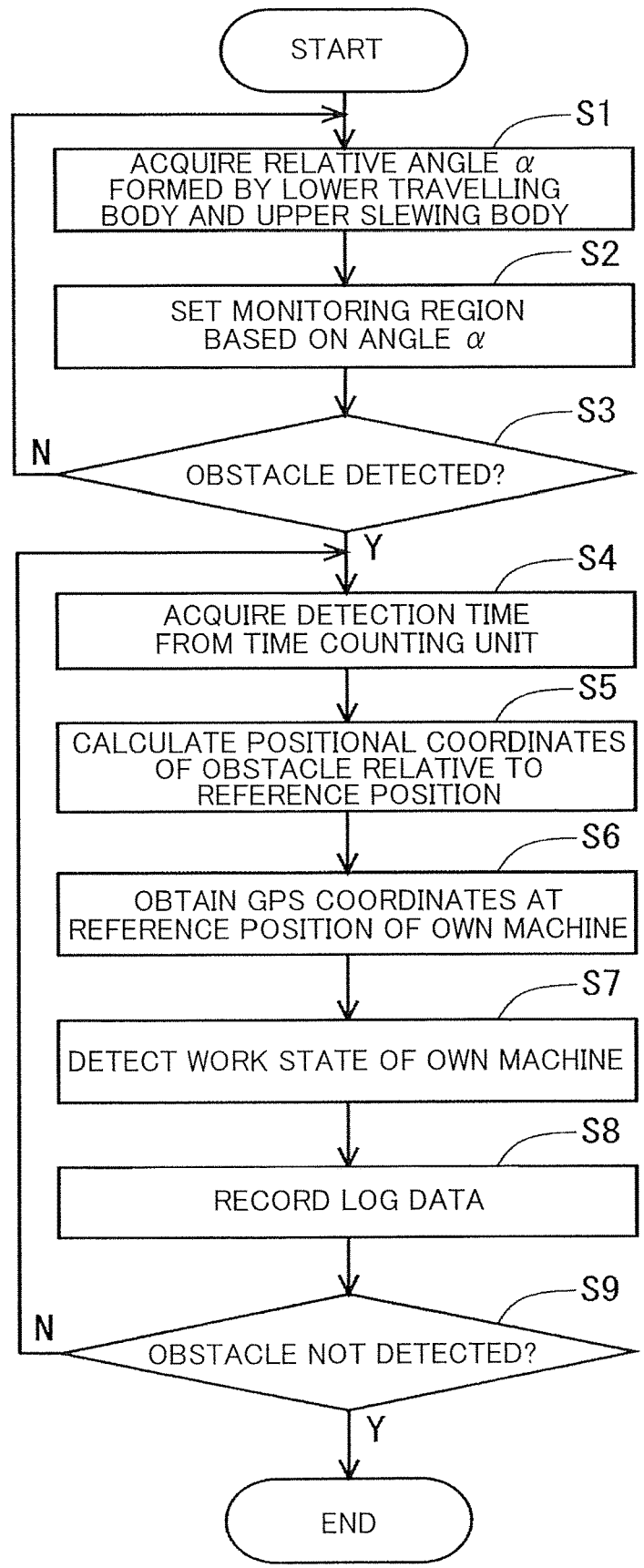
FIG. 9 is a flow chart showing log data recording processing.

The control unit 4 is a processing unit which controls various kinds of processing including processing of the flow chart in FIG. 9 (to be described later). Specifically, the control unit 4 includes a first calculation portion 4a, a monitoring region setting portion 4b, a generation portion 4c, a second calculation portion 4d, and a count portion 4e.

Figure 10:
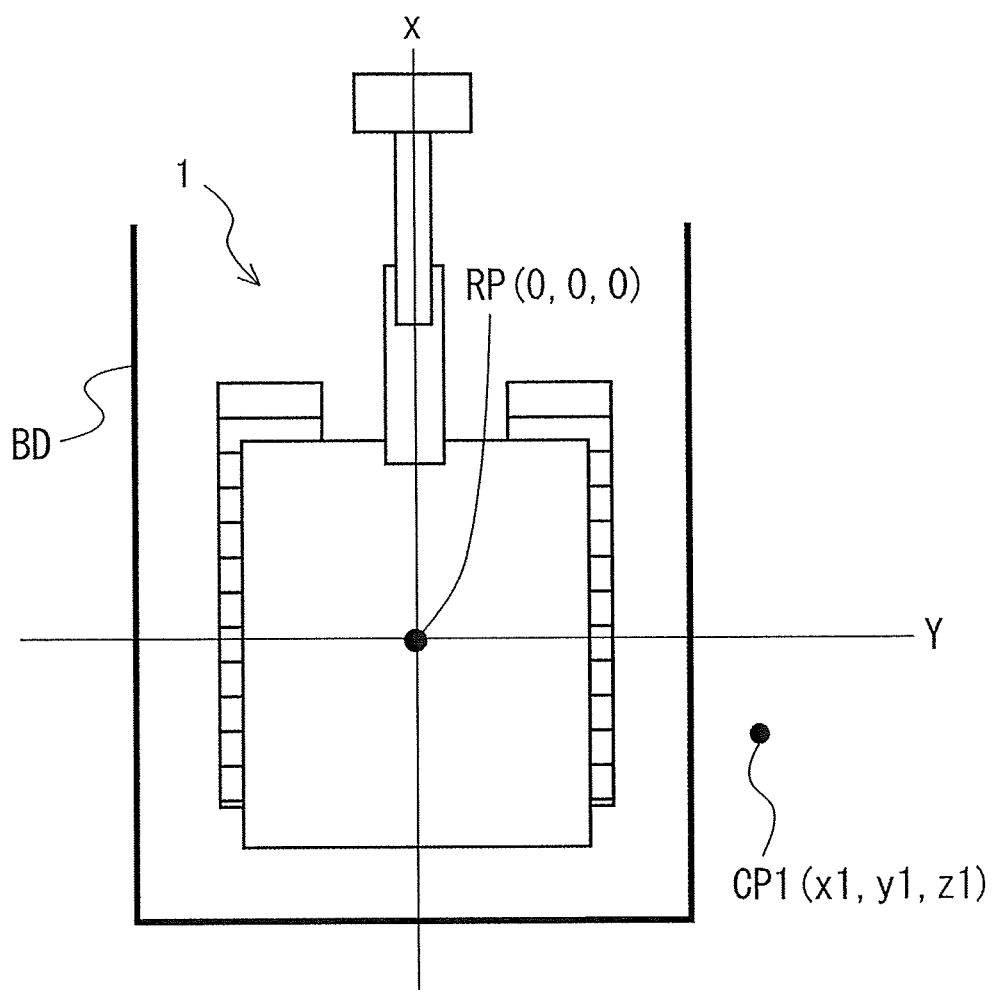
FIG. 10 is a plan view for explaining a position where an obstacle is detected and a boundary set in the hydraulic excavator.

The first calculation portion 4a calculates first position information including positional coordinates of an obstacle relative to the reference position RP set in advance in the hydraulic excavator 1 on the basis of detection results obtained by the sensors 31L, 31R, and 31B. Specifically, as shown in FIG. 10, in a case where three-dimensional coordinates of the reference position are set to be (0,0,0), the first calculation portion 4a calculates three-dimensional coordinates (x1, y1, z1) of an obstacle as first positional coordinates CP1. In the example shown in FIG. 10, since an obstacle is positioned on the right side of the hydraulic excavator 1, the first calculation portion 4a calculates the first positional coordinates CP1 on the basis mainly of a detection result obtained by the right side sensor 31R.

The monitoring region setting portion 4b sets monitoring regions 310L, 310R, and 310B in the surroundings of the hydraulic excavator 1 as shown in FIGS. 5 to 8 on the basis of the relative angle α detected by the angle detection portion 33 as shown in FIG. 4. In the following, description will be first made of the monitoring regions 310L, 310R, and 310B.

The monitoring regions 310L, 310R, and 310B are regions set in advance for detecting a person or an object approaching the hydraulic excavator 1 as an obstacle. Additionally, the monitoring regions 310L, 310R, and 310B are set to be regions hard to be seen from an operator in the cabin 3b. Specifically, the monitoring region 310L is set on the left side of the upper slewing body 3, the monitoring region 310R is set on the right side of the upper slewing body 3, and the monitoring region 310B is set in the rear of the upper slewing body 3. However, positions of the monitoring regions 310L, 310R, and 310B are not limited thereto but may be monitoring regions easily seen from an operator.

Figure 5:
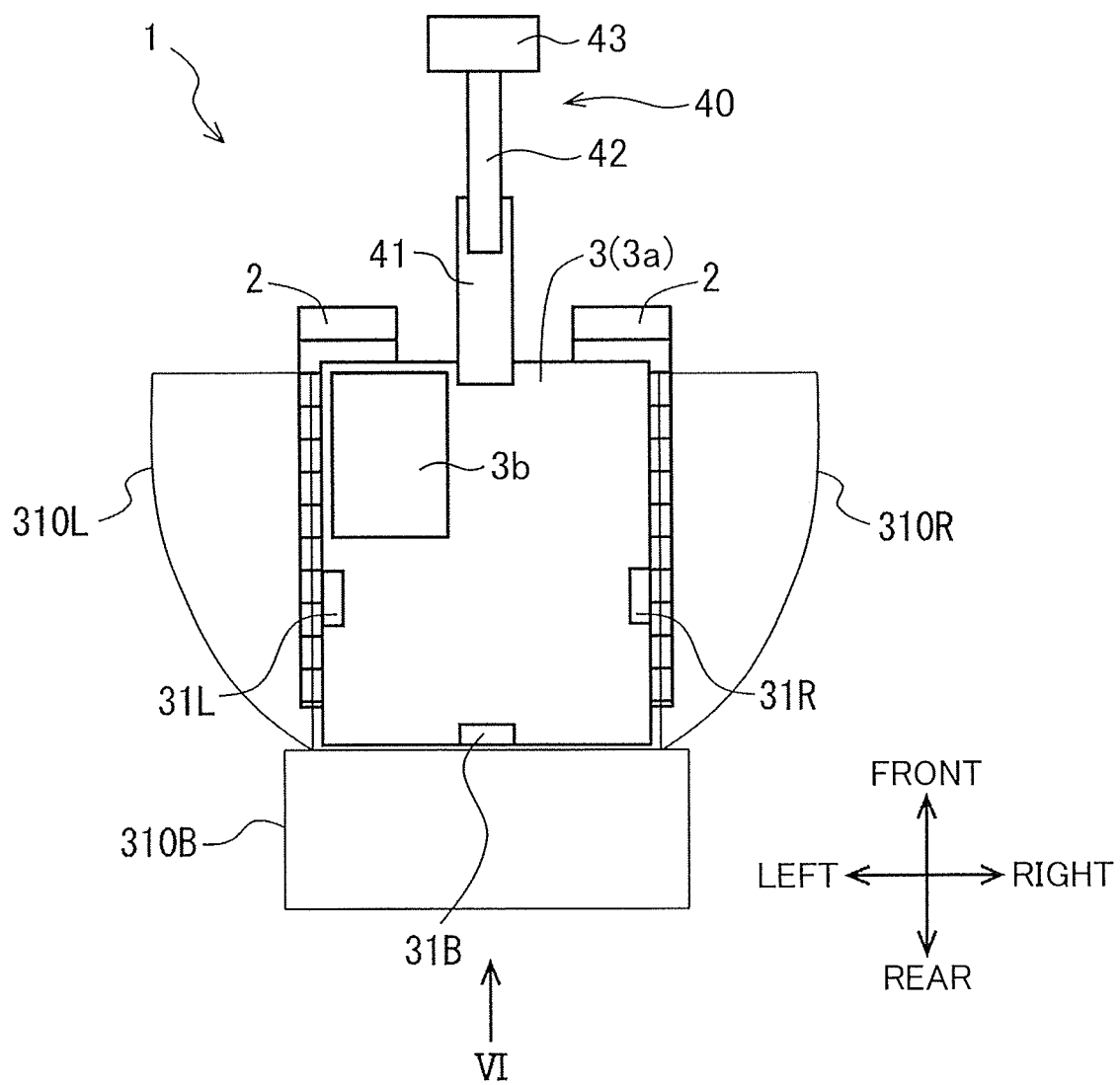
FIG. 5 is a plan view of the hydraulic excavator for explaining a monitoring region in a case where the lower travelling body and the upper slewing body face to the same direction.
Figure 6:
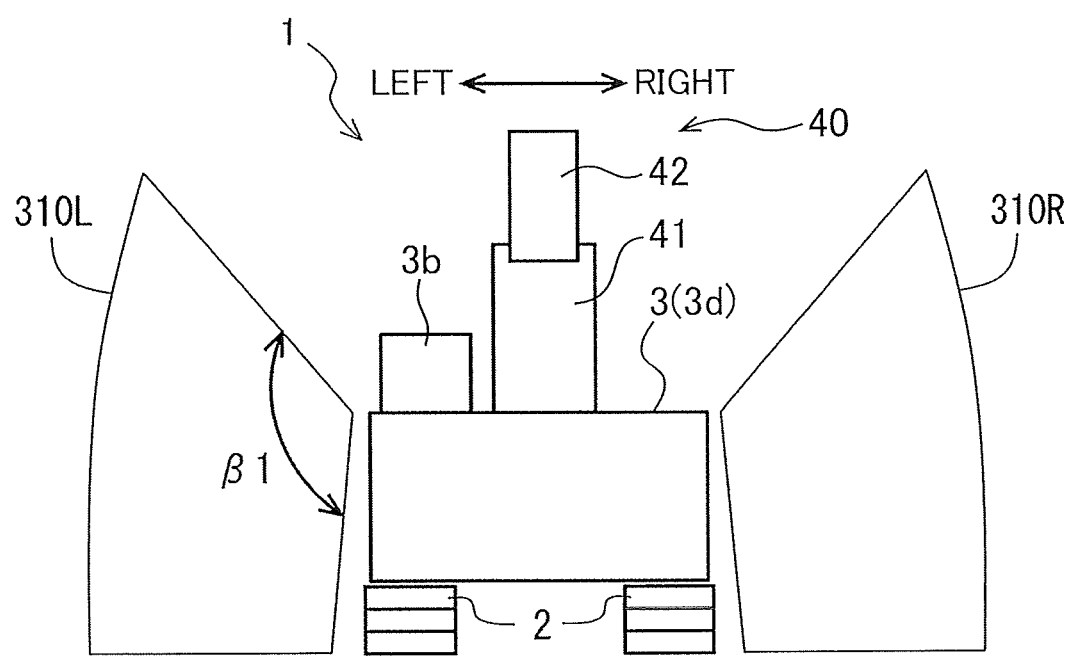
FIG. 6 is a view (a rear view with the upper slewing body as a reference) seen from an arrow VI of FIG. 5.

FIG. 5 and FIG. 6 show the monitoring regions 310L, 310R, and 310B in a state where the lower travelling body 2 and the upper slewing body 3 face to the same direction. Here, the state where the lower travelling body 2 and the upper slewing body 3 face to the same direction represents a state where a travelling direction of the lower travelling body 2 and a front-rear direction of the upper slewing body 3 (the front-rear direction seen from the operator in the cabin 3b: this applies hereinafter) coincide with each other.

Figure 7:
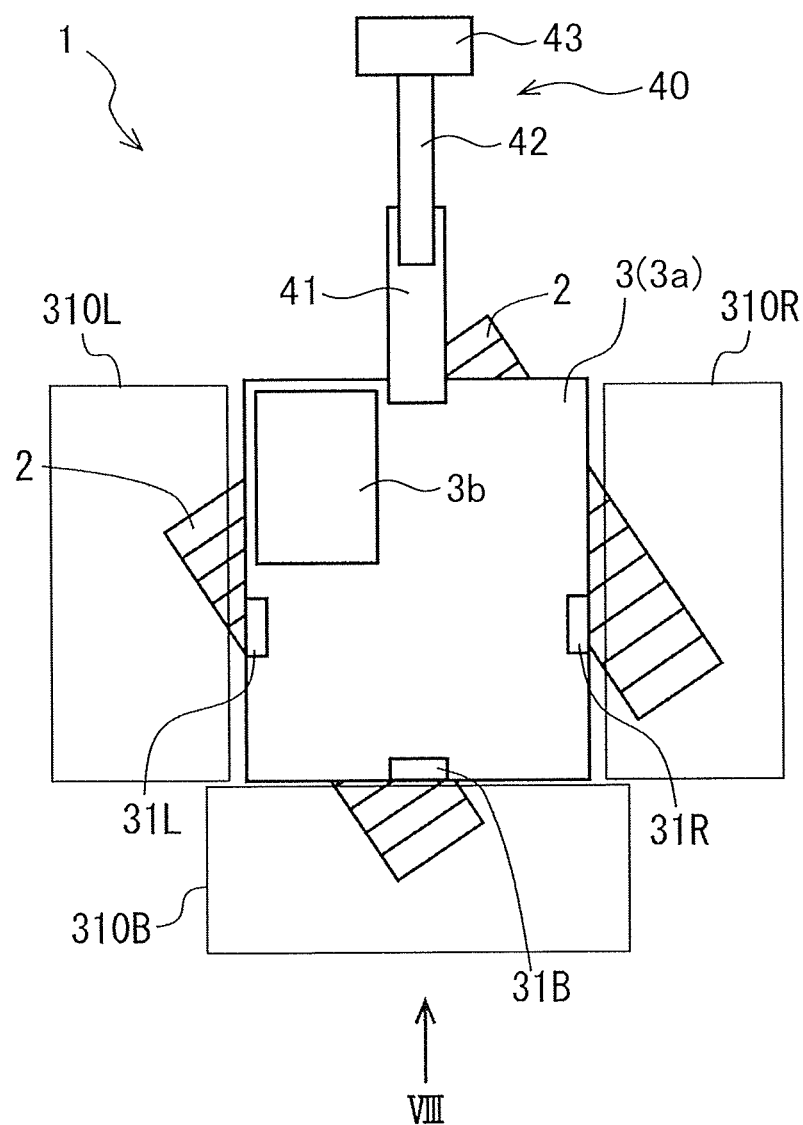
FIG. 7 is a plan view of the hydraulic excavator for explaining a monitoring region in a case where the lower travelling body and the upper slewing body face to different directions.
Figure 8:
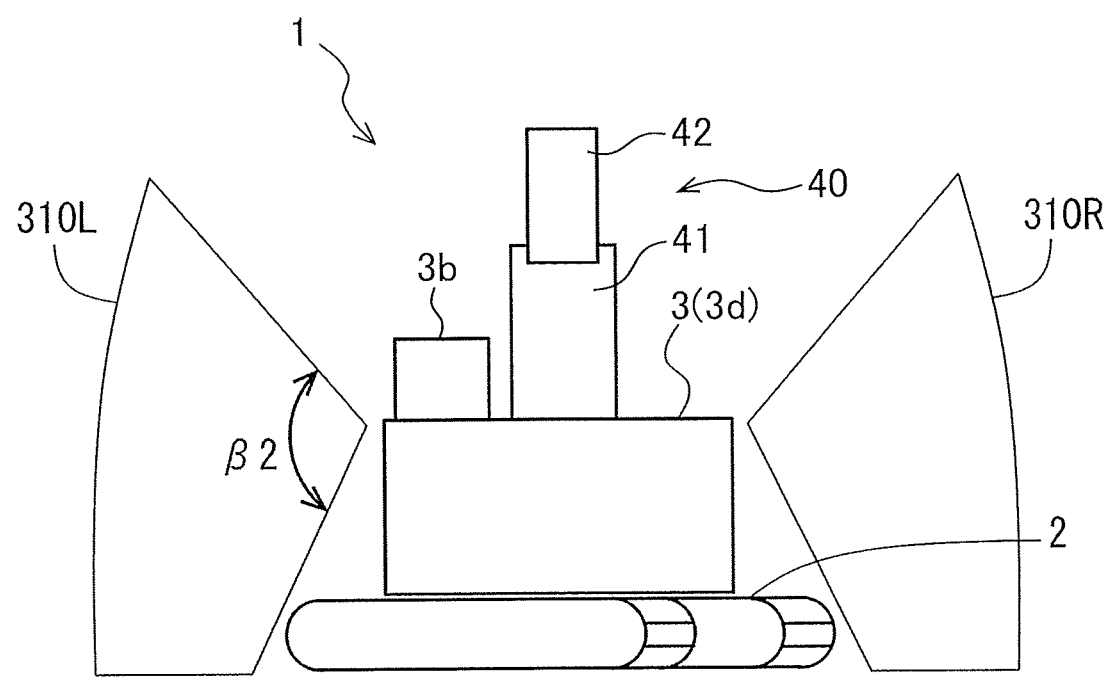
FIG. 8 is a view (a rear view with the upper slewing body as a reference) seen qfrom an arrow VIII of FIG. 7.

On the other hand, FIG. 7 and FIG. 8 show the monitoring regions 310L, 310R, and 310B in a state where the upper slewing body 3 turns, so that the lower travelling body 2 and the upper slewing body 3 face to different directions. Here, the state where the lower travelling body 2 and the upper slewing body 3 face to different directions represents a state where the travelling direction of the lower travelling body 2 and the front-rear direction of the upper slewing body 3 do not coincide with each other.

The monitoring region 310L is a region set on the left side of the hydraulic excavator 1 on the basis of the detection region of the left side sensor 31L. The monitoring region 310R is a region set on the right side of the hydraulic excavator 1 on the basis of the detection region of the right side sensor 31R. The monitoring region 310B is a region set in the rear of the hydraulic excavator 1 on the basis of the detection region of the rear side sensor 31B.

Specifically, the monitoring region setting portion 4b determines whether the lower travelling body is positioned in the detection regions of the sensors 31L, 31R, and 31B or not on the basis of the relative angle α (see FIG. 4) detected by the angle detection portion 33, and when the lower travelling body 2 is positioned in the detection regions, sets regions obtained by excluding the lower travelling body 2 from the detection regions as the monitoring regions 310L, 310R, and 310B.

As shown in FIG. 5 and FIG. 6, in the case where the lower travelling body 2 and the upper slewing body 3 face to the same direction, the lower travelling body 2 is not present within the detection regions of the sensors 31L, 31R, and 31B. Therefore, the monitoring region setting portion 4b sets the same regions as the detection regions of the sensors 31L, 31R, and 31B to be the monitoring regions 310L, 310R, and 310B.

On the other hand, in the case where the lower travelling body 2 and the upper slewing body 3 face to different directions as shown in FIG. 7 and FIG. 8, a part of the lower travelling body 2 is positioned in the sensors 31L, 31R, and 31B. Therefore, the monitoring region setting portion 4b sets regions obtained by excluding the lower travelling body 2 from the detection regions of the sensors 31L, 31R, and 31B as the monitoring regions 310L, 310R, and 310B. Specifically, as shown in FIG. 8, by upwardly narrowing angles of view of the left side sensor 31L and the right side sensor 31R, the lower travelling body 2 is excluded from the detection regions of both the sensors 31L and 31R. Although not shown, an angle of view of the rear side sensor 31B is also narrowed upwardly, resulting in excluding the lower travelling body 2 from the detection region of the rear side sensor 31B.

As a result, as show in FIG. 8, the monitoring regions 310L, 310B, and 310B in the case where the lower travelling body 2 and the upper slewing body 3 face to the different directions are set to be narrower in a vertical direction than the monitoring regions 310L, 310R, and 310B in the case where both the bodies face to the same direction (in a case of FIG. 5). Specifically, while angles of view of the sensors in the monitoring regions 310L and 310R are β1 in FIG. 6, the angles of view in FIG. 8 are β2 smaller than β1. Such adjustment of an angle of view suppresses erroneous detection of the lower travelling body 2 as an obstacle in the case of FIG. 8.

The monitoring regions 310L and 310R in the case where the lower travelling body 2 and the upper slewing body 3 face to different directions (in the case of FIG. 7) are set to be wider in the horizontal direction than the monitoring regions 310L and 310R in the case where both bodies face to the same direction (in the case of FIG. 5). The reason is that in the case where the lower travelling body 2 and the upper slewing body 3 face to different directions, it is necessary to detect the rear side in the travelling direction of the lower travelling body 2 by the left side sensor 31L or the right side sensor 31R.

Again with reference to FIG. 3, the second calculation portion 4d calculates the second positional coordinates CP2 (the second position information) including GPS coordinates of the reference position RP (see FIG. 10) of the hydraulic excavator 1 on the basis of information received by the GPS receiving portion 37.

The time counting unit 8 has time information for specifying time when an obstacle is detected by the sensors 31L, 31R, and 31B. Specifically, the time counting unit 8 has a function of updating time set in advance and outputs current time in response to an output instruction from the control unit 4. The time counting unit 8 is one example of a time information holding portion.

The storage unit 5 stores log data shown in FIG. 11, the log data correlating the first position information (the first positional coordinates CP1), the second position information (the second positional coordinates CP2), the time information obtained by the time counting unit 8, and a work state of the hydraulic excavator 1 detected by the work state detection portion 35 with each other. The storage unit 5 also stores a log data table TB shown in FIG. 11 (see FIG. 11), map data of a work site, and the like. The log data table TB is a table for storing, as log data, information about an obstacle detected in the monitoring regions 310L, 310R, and 310B (in the surroundings of the hydraulic excavator 1). Specifically, in the log data table TB, there are stored, so as to be correlated with each other, the time information obtained by the time counting unit 8, relative positional coordinates of an obstacle (the first positional coordinates CP1) with respect to the reference position RP, the positional coordinates of the reference position RP (the second positional coordinates CP2) obtained by the GPS receiving portion 37, and a work state of the hydraulic excavator 1 detected by the work state detection portion 35. In the log data table TB, the first positional coordinates CP1, the second positional coordinates CP2, and a work state of the hydraulic excavator 1 are stored in time series.

Next, recording processing of log data conducted by the control unit 4 will be described with reference to the flow chart of FIG. 9.

First, in Step S1, the control unit 4 acquires the relative angle α between the lower travelling body 2 and the upper slewing body 3 from the angle detection portion 33.

In Step S2, the control unit 4 (the monitoring region setting portion 4b) determines whether the lower travelling body 2 is positioned in the detection regions of the sensors 31L, 31R, and 31B or not on the basis of the relative angle α detected by the angle detection portion 33 to set the monitoring regions 310L, 310R, and 310B.

For example, in the case where the lower travelling body 2 and the upper slewing body 3 face to the same direction (in the case where the lower travelling body 2 is not positioned in the detection regions of the sensors 31L, 31R, and 31B), the monitoring regions 310L, 310R, and 310B are set within ranges shown in FIG. 5 and FIG. 6. Additionally, in the case where the lower travelling body 2 and the upper slewing body 3 face to different directions (in the case the lower travelling body 2 is positioned in the detection regions of the sensors 31L, 31R, and 31B), the monitoring regions 310L, 310R, and 310B are set, for example, within ranges shown in FIG. 7 and FIG. 8.

In Step S3, the control unit 4 causes the left side sensor 31L, the right side sensor 31R, and the rear side sensor 31B to operate and determines whether an obstacle is detected in the monitoring regions 310L, 310R, and 310B or not. In a case where an obstacle is detected, the control unit also detects a distance from each of the sensors 31L, 31R, and 31B to the obstacle. On the other hand, the processing in Steps S1 to S3 is repeated during a period before detection of an obstacle.

Then, when an obstacle is detected (S3: YES), the processing proceeds to Step S4. In Step S4, the control unit 4 acquires current time held by the time counting unit 8 as time when the obstacle is detected.

In Step S5, the control unit 4 (the first calculation portion 4a) calculates the first positional coordinates CP1 (the first position information) of an obstacle relative to the reference position RP of the hydraulic excavator 1 on the basis of the detection results obtained by the sensors 31L, 31R, and 31B as shown in FIG. 10. Specifically, the control unit 4 calculates coordinates (x1, y1, z1) of an obstacle as the first positional coordinates CP1 in a case where three-dimensional coordinates of the reference position RP are set to be (0, 0, 0). The first positional coordinates CP1 are one example of the first position information.

In Step S6, the control unit 4 calculates GPS coordinates of the reference position RP of the hydraulic excavator 1 as the second positional coordinates CP2 (X1, Y1, Z1) at the work site on the basis of information received by the GPS receiving portion 37 for specifying the second positional coordinates CP2 of the reference position RP. The second positional coordinates CP2 are one example of the second position information.

In Step S7, the work state detection portion 35 detects the work state (in work or during stop) of the hydraulic excavator 1, and the detection result is input to the control unit 4.

In Step S8, the control unit 4 generates log data correlating time acquired in Step S4, the first positional coordinates CP1 calculated in Step S5, the second positional coordinates CP2 calculated in Step S6, and the work state detected in Step S7 with each other, and stores the log data in the log data table TB shown in FIG. 11. The control unit 4 stores the log data in the log data table TB in time series starting with the oldest log data.

In Step S9, the control unit 4 determines whether an obstacle enters a state where the obstacle cannot be detected in the monitoring regions 310L, 310R, and 310B or not on the basis of the detection results of the sensors 31L, 31R, and 31B. In a case where an obstacle is still detected in the monitoring regions 310L, 310R, and 310B (S9: NO), the control unit 4 again executes the above-described processing of Steps S4 to S8. In other words, during a period when the obstacle is present in the monitoring regions 310L, 310R, and 310B, the control unit 4 repeats recording of the log data at a predetermined interval. On the other hand, in a case where no more obstacle is detected in the monitoring regions 310L, 310R, and 310B (S9: YES), the control unit 4 ends log data recording processing.

As a result of execution of the above-described log data recording processing, log data related to an obstacle is recorded in the log data table TB shown in FIG. 11 in time series.

The control unit 4 also executes warning output processing in addition to the above-described log data recording processing. In the following, a configuration of the hydraulic excavator 1 for executing the warning output processing will be described.

The storage unit 5 stores a boundary BD set in proximity to the hydraulic excavator 1 as shown in FIG. 10. The boundary BD is set independently of the above monitoring regions 310L, 310R, and 310B. Specifically, the boundary BD is set in advance in the detection regions of the sensors 31L, 31R, and 31B capable of detecting presence/absence of an obstacle and a distance to the obstacle. The storage unit 5 stores coordinates of the boundary BD relative to the reference position RP.

With reference to FIG. 3, the control unit 4 includes the count portion 4e which counts the number of approaches of an obstacle to the hydraulic excavator 1 over the boundary BD. Specifically, the count portion 4e determines whether an obstacle approaches the hydraulic excavator 1 over the boundary BD or not on the basis of the first positional coordinates CP1 of an obstacle relative to the reference position RP calculated by the first calculation portion 4a, and the coordinates of the boundary BD stored in the storage unit 5. Here, in a case where determination is made that an obstacle approaches the hydraulic excavator 1 over the boundary BD, the count portion 4e counts the number of approaches (increment), and when the number of approaches exceeds a threshold value set in advance, outputs, to the warning output unit 9 to be described later, an instruction to give warning.

The warning output unit 9 outputs warning to the operator of the hydraulic excavator 1 when the number of approaches counted by the count portion 4e exceeds the threshold value. Specifically, the warning output unit 9 outputs warning by a buzzer sound in response to the output instruction from the control unit 4 (the count portion 4e). The warning output unit 9 can be formed with a warning buzzer.

Figure 12:
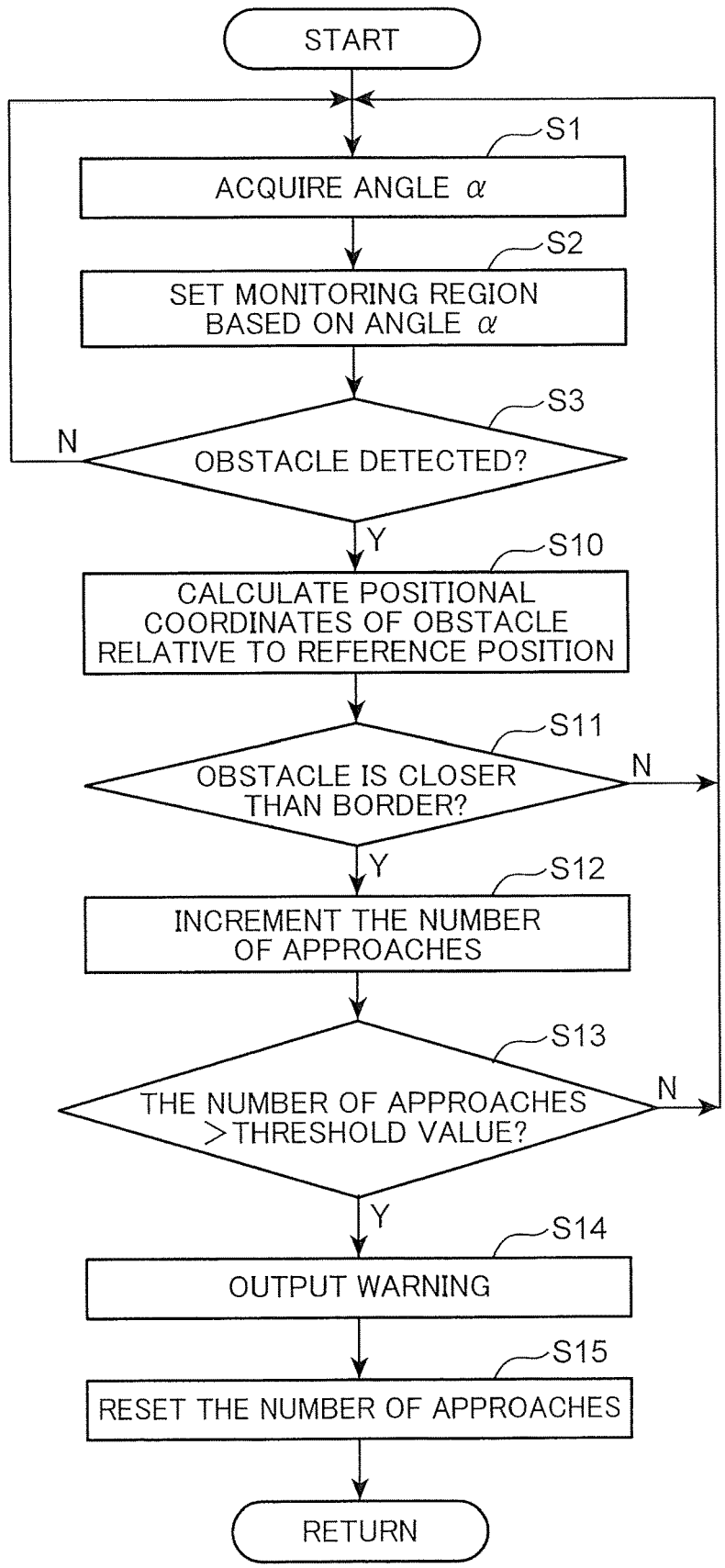
FIG. 12 is a flow chart showing warning output processing.

In the following, the warning output processing executed by the control unit 4 will be described with reference to the flow chart in FIG. 12. Since Steps S1 to S3 in FIG. 12 are the same as Steps S1 to S3 in FIG. 9, no description will be made thereof.

When an obstacle is detected in the monitoring regions 310L, 310R, and 310B (S3: YES), the control unit 4 (the first calculation portion 4a) calculates the first positional coordinates CP1 of the obstacle relative to the reference position RP of the hydraulic excavator 1 on the basis of detection results of the sensors 31L, 31R, and 31B in Step S10. Since the processing in Step S10 is the same as that of Step S5 in FIG. 9, no description will be made thereof.

In Step S11, the control unit 4 (the count portion 4e) determines whether the obstacle approaches the hydraulic excavator 1 over the boundary BD on the basis of the coordinates of the boundary BD stored in the storage unit 5 and the first positional coordinates CP1 calculated in Step S5.

Here, when determination is made that the obstacle does not approach the hydraulic excavator 1 over the boundary BD (S11: NO), the processing returns to Step S1.

On the other hand, when determination is made that the obstacle approaches the hydraulic excavator 1 over the boundary BD (S11: YES), the control unit 4 (the count portion 4*e*) increments a counter indicative of the number of approaches by one in Step S12. An initial value of the counter indicative of the number of approaches is set to be "0".

Next, the control unit 4 (the count portion 4*e*) determines whether the number of approaches exceeds the threshold value set in advance or not in Step S13, and in a case where the number of approaches is not more than the threshold value (S13: NO), the processing returns to Step S1.

On the other, in a case where the number of approaches exceeds the threshold value (S13: YES), the control unit 4 (the count portion 4*e*) outputs, to the warning output unit 9, an instruction to give warning in Step S14, and the warning output unit 9 outputs warning for a fixed time period.

Next, after output of the warning for a fixed time period, the counter indicative of the number of approaches is initialized (i.e. set to be "0") in Step S15 to return the processing to Step S1.

The hydraulic excavator 1 also has a function of displaying a plan of a work site in the display unit 6 (see FIG. 3). In the following, description will be made of a configuration for displaying the plan of a work site.

The storage unit 5 further stores the map data of a work site. The map data of the work site includes information about a position and a dimension of the work site (information including latitude, longitude, elevation, shape, area, and the like), and information about a position and a size (information including latitude, longitude, shape, size, etc.) of an installation object (a wall, a utility pole, etc.) disposed at the work site.

The second calculation portion 4*d* calculates a position (coordinates) of an obstacle at the work site on the basis of the first positional coordinates CP1 and the second positional coordinates CP2 correlated with the log data, and the map data.

The control unit 4 includes the generation portion 4*c* which generates a plan of a work site on the basis of the map data stored in the storage unit 5. Specifically, the generation portion 4*c* specifies a shape and a size of the work site, as well as specifying a position and a size of an installation object at the work site on the basis of the information about a position and a dimension of the work site and the information about a position and a size of the installation object disposed at the work site, the information being included in the map data, and generates a plan of a work site for illustrating these specified data.

With reference to FIG. 3, the hydraulic excavator 1 is further equipped with the display unit 6 for displaying a plan of a work site generated by the generation portion 4*c*, and a position of an obstacle at a work site which is calculated by the second calculation portion 4*d*. The display unit 6 is a display such as an LCD which is provided in the cabin 3*b* and has a function of displaying various kinds of screens.

The hydraulic excavator 1 is further equipped with the input unit 10 for inputting, to the control unit, an instruction for causing the display unit 6 to display a plan of a work site and a position of an obstacle on the plan of a work site. In response to operation of the input unit 10 by an operator in the cabin 3*b*, the control unit 4 outputs, to the display unit 6, an instruction for causing the display unit to display a plan of a work site and an obstacle.

Figure 14:
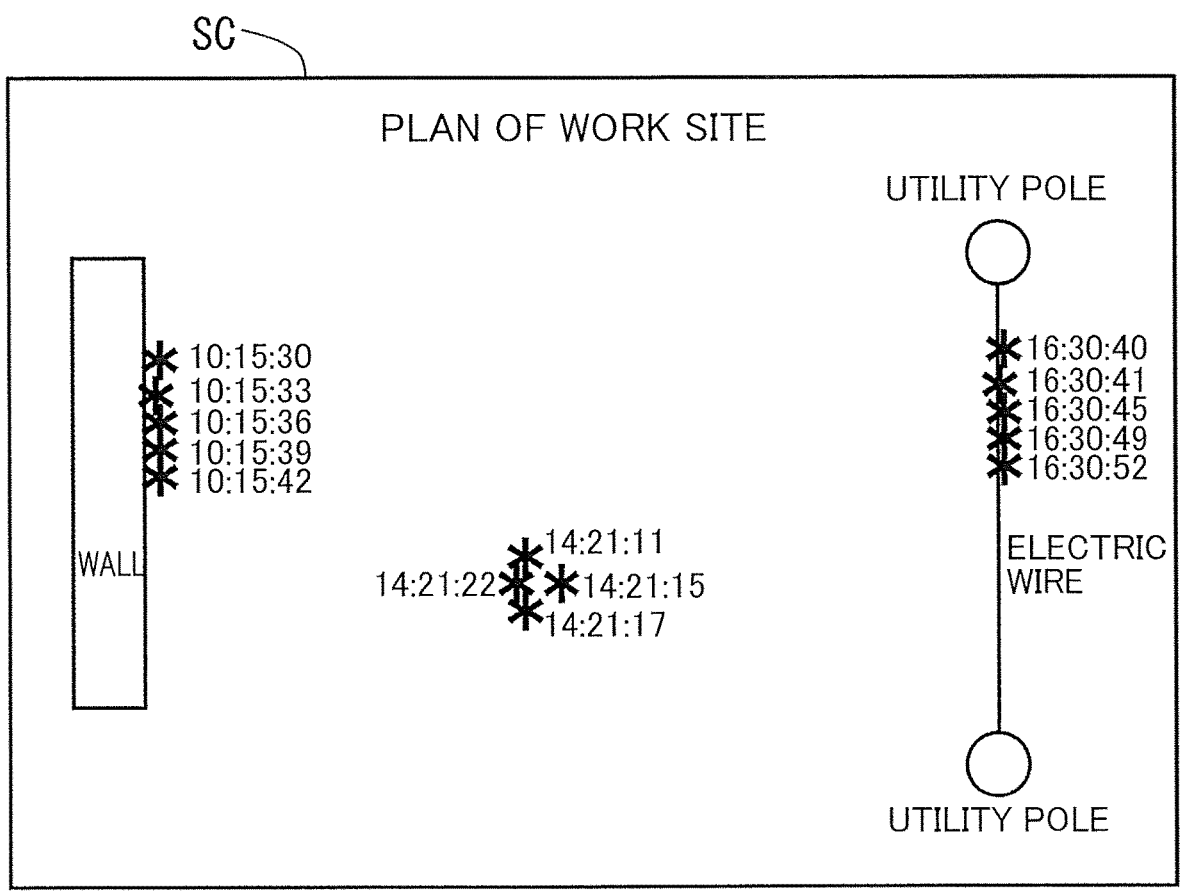
FIG. 14 is a view of a work site in a state where a position of an obstacle is indicated based on log data.

Specifically, the display unit 6 displays a screen SC shown in FIG. 14. The screen SC includes a plan of a work site corresponding to a plan view of a work site, an obstacle arranged on a plan of a work site (indicated by a sign *), and a detection time of an obstacle arranged adjacent to the sign *. The detection time of an obstacle can be omitted from the screen SC.

Figure 13:
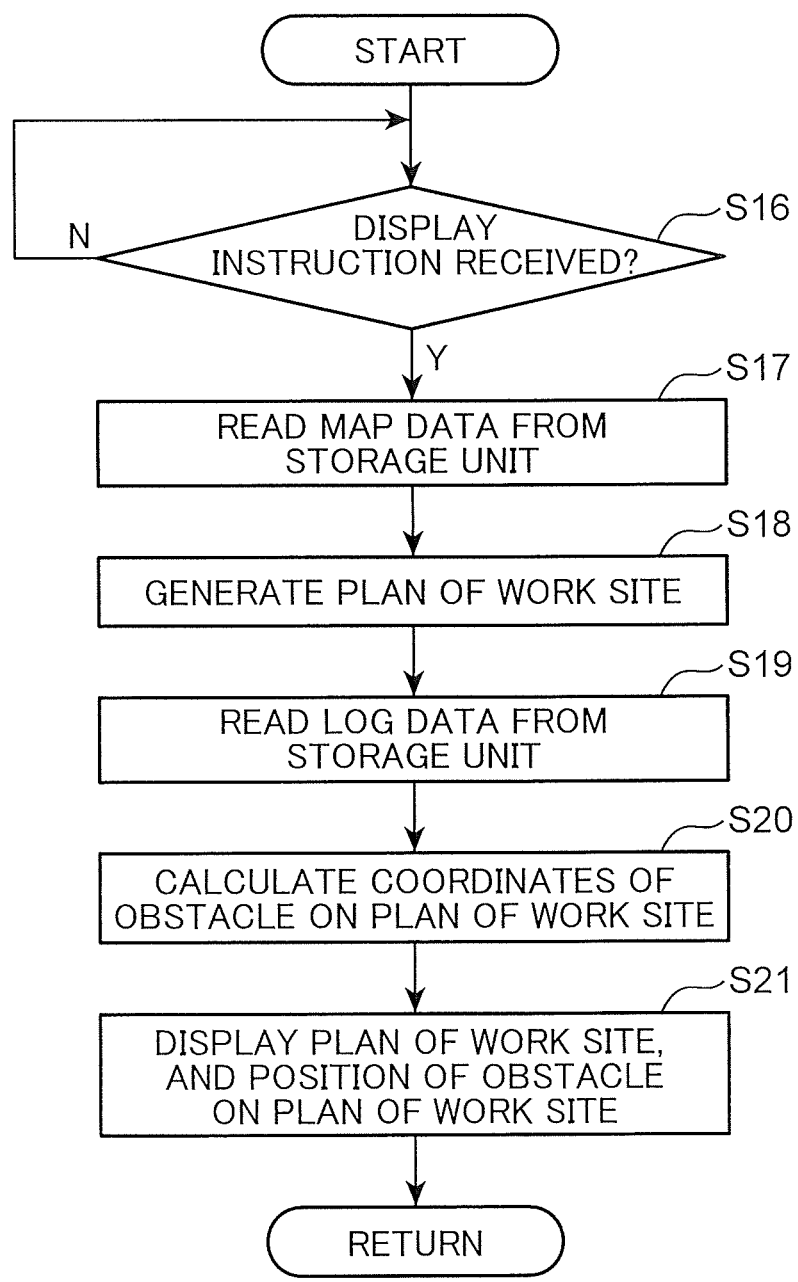
FIG. 13 is a flow chart showing display processing.

With reference to FIG. 13, description will be made of display processing of a plan of a work site conducted by the control unit 4 in the following.

In Step S16, the control unit 4 waits for input of an instruction for displaying a plan of a work site by an operator in the cabin 3*b* by operation of the input unit 10.

When determination is made that the instruction for displaying a plan of a work site is input (S16: NO), the control unit 4 (the generation portion 4*c*) reads the map data stored in the storage unit 5 (Step S17) and generates a plan of a work site (Step S18).

In Step S19, the control unit 4 (the second calculation portion 4*d*) reads the log data from the log data table TB in the storage unit 5.

Next, in Step S20, the control unit 4 (the second calculation portion 4*d*) calculates coordinates of an obstacle on the plan of a work site on the basis of the first positional coordinates CP1 and the second positional coordinates CP2.

Then, in Step S21, the control unit 4 (the second calculation portion 4*d*) causes the display unit 6 to display the screen SC (FIG. 12) which shows the plan of a work site and a position of the obstacle (sign "*") on the plan of a work site.

In FIG. 12, the signs "*" present along outlines of a wall and an electric wire indicate a wall and an electric wire detected as obstacles. Thus displaying a position of an obstacle on a plan of a work site as well allows one who looks at the plan of a work site to understand that the signs "*" present along the outlines of the wall and the electric wire represent a wall and an electric wire.

On the other hand, the sign "*" provided in a generally central part of the plan of a work site, i.e., provided in a part where no installation object such as a wall, a utility pole, or an electric wire is present represents a worker or other obstacle approaching the hydraulic excavator 1 and being detected as an obstacle. One who looks at the plan of a work site can understand that one obstacle or other is present even in a part of the work site where no installation object is present.

Also as shown in FIG. 3, the hydraulic excavator 1 is equipped with the communication unit 7 capable of transmitting and receiving data including log data to/from an external apparatus OM via a network N (e.g. mobile phone communication network etc.). The communication unit 7 transmits and receives data to/from the external apparatus OM in response to an instruction from the control unit 4. For example, the communication unit 7 is capable of transmitting, to the external apparatus OM, not only log data but also information stored in the storage unit 5, information calculated by the control unit 4, and information (including a plan of a work site, and the number of counting by the count portion 4*e*) generated by the control unit 4 in response to an instruction from the control unit 4.

As described in the foregoing, according to the present embodiment, log data is recorded in time series, the log data correlating time when an obstacle is detected with the first positional coordinates CP1. Therefore, not only a position of an obstacle but also a time zone in which the obstacle is detected can be grasped.

As described in the foregoing, in a case where the sensors 31L, 31R, and 31B are provided in the upper slewing body 3, turning of the upper slewing body 3 at a specific angle might result in causing the lower travelling body 2 to enter the detection regions of the sensors 31L, 31R, and 31B, so that the lower travelling body 2 is erroneously detected as an obstacle. Therefore, in a case, as described above, where determination made whether the lower travelling body 2 is positioned in the detection region or not on the basis of the relative angle α detected by the angle detection portion 33 results in finding the lower travelling body 2 being positioned in the detection region, setting a region obtained by excluding the lower travelling body 2 from the detection region as the monitoring regions 310L, 310R, and 310B can suppress such erroneous detection as described above.

Also in the present embodiment, since the second positional coordinates CP2 as GPS coordinates of the reference position RP of the hydraulic excavator 1 are further correlated with the log data, it is possible to grasp not only a relative position of an obstacle with respect to the hydraulic excavator 1 but also an absolute position of an obstacle.

The present embodiment also enables a work state of the hydraulic excavator 1 to be grasped at the time when an obstacle is detected because a work state (in work or during stop) is further correlated with the log data of the hydraulic excavator 1.

Since the present embodiment has the communication unit 7 capable of transmitting and receiving log data to/from the external apparatus OM via the network N, a third party (a site supervisor etc.) other than an operator can grasp approach of an obstacle to the hydraulic excavator 1 in real time.

Also in the present embodiment, when an obstacle is detected, warning is not simply output but log data which correlates a position of the obstacle with time when the obstacle is detected is stored. Therefore, not only an operator but also a site supervisor as a third party, etc., can grasp a position of an obstacle and a time zone where the obstacle is detected, and the like.

Additionally, since log data is recorded in time series in the present embodiment, it is also possible to grasp whether an obstacle is a stationary object or not, and in a case where the obstacle is not a stationary object, to grasp movement of the obstacle (i.e., whether the obstacle approaches the hydraulic excavator 1 or goes away therefrom, etc.).

According to the present embodiment, a position of an obstacle at a work site (on a plan of a work site) can be specified. Thus, it is possible to efficiently conduct safety management of work at the work site.

According to the present embodiment, a plan of a work site can be generated by the generation portion 4c on the basis of the map data stored in the storage unit 5.

Additionally, in the present embodiment, a buzzer sound is output when the number of approaches made by an obstacle to the hydraulic excavator 1 over the boundary BD exceeds a threshold value. Thus, an operator can reliably recognize that the obstacle approaches.

The construction machine according to the present invention is not limited to the above-described embodiment but may be varied or modified within a range of claims.

For example, the above embodiment has been described with respect to a case where the monitoring regions 310L, 310R, and 310B are set on the basis of the relative angle α calculated by the angle detection portion 33. In detail, the range shown in FIG. 5 and FIG. 6 is set to be the monitoring regions 310L, 310R, and 310B in the case where the lower travelling body 2 and the upper slewing body 3 face to the same direction. In the case where the lower travelling body 2 and the upper slewing body 3 face to different directions, the range shown in FIG. 7 and FIG. 8 is set to be the monitoring regions 310L, 310R, and 310B. However, the monitoring region is not limited thereto but, for example, a range designated in advance may be uniformly set as a monitoring region. In this case, unlike the above embodiment, reference to the relative angle α is not required and therefore the angle detection portion 33 can be omitted.

Additionally, while the above embodiment has been described with respect to a case where log data is recorded in the log data table TB in the storage unit 5, a log data recording destination is not limited to the storage unit 5. For example, log data may be transmitted to a designated external device via the communication unit 7 and be recorded in the external device. In this manner, a third party (a site supervisor etc.) other than an operator can grasp approach of an obstacle in real time. The log data may also be recorded in both the storage unit 5 and the external device.

While the above embodiment has been described with respect to a case where the number of approaches is counted, i.e. the number of times when an obstacle approaches the hydraulic excavator 1 side over the boundary BD, a basis on which an approach is counted or not is not limited to the boundary BD. It is for example possible to count the number of entries of an obstacle into the monitoring regions 310L, 310R, and 310B as the number of approaches without setting the boundary BD.

Also, while in the above embodiment, time, the first positional coordinates CP1, the second positional coordinates CP2, and a work state are correlated with each other in the log data, a correlation target is not limited thereto. For example, orientation data received by the GPS receiving portion 37 may be further correlated in the log data. In this manner, it is possible to grasp the orientation of the upper slewing body 3 when an obstacle is detected.

Additionally, while in the above embodiment, a two-dimensional map is illustrated as an example of a plan of a work site as shown in FIG. 12, the plan of a work site is not limited to a two-dimensional map. The plan of a work site may be a three-dimensional map.

The above-described specific embodiment mainly includes the invention having the following configuration.

In order to solve the above problem, the present invention provides a construction machine including a lower travelling body; an upper slewing body provided on the lower travelling body to be turnable with respect to the lower travelling body; an obstacle detection sensor which detects presence/absence of an obstacle in a monitoring region set around the construction machine in advance and a distance to the obstacle; a first calculation portion which calculates first position information including positional coordinates of the obstacle relative to a reference position set in the construction machine in advance based on a detection result obtained by the obstacle detection sensor; a time information holding portion which has time information for specifying time when the obstacle is detected; and a storage unit which stores log data that correlates the first position information with the time information.

According to the present invention, log data which correlates time when an obstacle is detected with the first position information is stored in the storage unit in time series. Therefore, not only a position of an obstacle but also a time zone where the obstacle is detected can be grasped.

In the construction machine, preferably the obstacle detection sensor has a detection region in which presence/absence of an obstacle and a distance to the obstacle can be detected and is provided in the upper slewing body, the construction machine further including an angle detection portion which detects a relative angle between the lower travelling body and the upper slowing body in a turning direction of the upper slewing body; and a monitoring region setting portion which determines whether the lower travelling body is positioned in the detection region or not based on the relative angle detected by the angle detection portion, and in a case where the lower travelling body is positioned in the detection region, sets a region obtained by excluding the lower travelling body from the detection region as the monitoring region.

In a case where the obstacle detection sensor is provided in the upper slewing body, turning of the upper slewing body at a specific angle might result in causing the lower travelling body to enter the detection region of the sensor, so that the lower travelling body is erroneously detected as an obstacle. Therefore, as in above mode, such erroneous detection as described above can be suppressed by determining whether the lower travelling body is positioned in the detection region or not based on the relative angle detected by the angle detection portion and when finding the lower travelling body being positioned in the detection region, by setting a region obtained by excluding the lower travelling body from the detection region as the monitoring regions.

The construction machine preferably further includes a position information receiving portion which receives a signal for specifying second position information including positional coordinates of the reference position, in which the storage unit stores the log data further correlating the second position information.

In this mode, since the second positional coordinates including positional coordinates of the reference position of the hydraulic excavator 1 are further correlated with the log data, not only a relative position of an obstacle with respect to the construction machine but also an absolute position of the obstacle can be grasped.

The construction machine preferably further includes a work state detection portion which detects a work state indicating whether the construction machine is in work or during stop, in which the storage unit stores the log data further correlating the work state.

In this mode, since a work state (in work or during stop) of the hydraulic excavator 1 is further correlated with the log data, a work state of the hydraulic excavator 1 at the time when the obstacle is detected can be also grasped.

The construction machine preferably further includes a communication unit capable of transmitting the log data to an external apparatus via a network.

In this mode, a third party (a site supervisor etc.) other than an operator can grasp approach of an obstacle to the construction machine in real time.

In the construction machine, preferably, the storage unit further stores map data of a work site, the construction machine further including a second calculation portion which calculates a position of the obstacle at the work site based on the first positional coordinates and the second positional information correlated with the log data, and the map data; and a display unit which displays a plan of a work site generated based on the map data, and a position of the obstacle at the work site which is calculated by the second calculation portion.

In this mode, since a position of an obstacle at a work site (on a plan of a work site) can be specified, it is possible to efficiently conduct safety management of work at the work site.

Specifically, the construction machine may further include a generation portion which generates the plan of a work site based on the map data.

In this mode, a plan of a work site can be generated by the generation portion on the basis of map data stored in the storage unit.

The construction machine preferably further includes a count portion which counts the number of approaches of the obstacle to the construction machine over a boundary set in advance in the detection region of the obstacle detection sensor, in the detection region of which, presence/absence of the obstacle and a distance to the obstacle can be detected; and a warning output unit which outputs warning to an operator of the construction machine when the number of approaches exceeds a threshold value set in advance.

In this mode, since warning is output when the number of approaches made by an obstacle to the construction machine side over the boundary exceeds a threshold value, an operator can reliably recognize that the obstacle approaches.

The invention claimed is:

1. A construction machine comprising:
a lower travelling body;
an upper slewing body provided on the lower travelling body to be turnable with respect to the lower travelling body;
an obstacle detection sensor which detects presence/absence of an obstacle in a monitoring region set around the construction machine in advance and a distance to the obstacle;
a first calculation portion which calculates first position information including positional coordinates of the obstacle relative to a reference position set in the construction machine in advance based on a detection result obtained by the obstacle detection sensor;
a time information holding portion which has time information for specifying time when the obstacle is detected; and
a storage unit which stores log data that correlates the first position information with the time information.

2. The construction machine according to claim 1, wherein the obstacle detection sensor has a detection region in which the presence/absence of the obstacle and the distance to the obstacle can be detected and is provided in the upper slewing body,
the construction machine further comprising:
an angle detection portion which detects a relative angle between the lower travelling body and the upper slewing body in a turning direction of the upper slewing body; and
a monitoring region setting portion which determines whether the lower travelling body is positioned in the detection region or not based on the relative angle detected by the angle detection portion, and in a case where the lower travelling body is positioned in the detection region, sets a region obtained by excluding the lower travelling body from the detection region as the monitoring region.

3. The construction machine according to claim 1, further comprising a position information receiving portion which receives a signal for specifying second position information including positional coordinates of the reference position, wherein the storage unit stores the log data further correlating the second position information.

4. The construction machine according to claim 3, wherein the storage unit further stores map data of a work site, the construction machine further comprising:
a second calculation portion which calculates a position of the obstacle at the work site based on the first position information and the second position information correlated with the log data, and the map data; and
a display unit which displays a plan of a work site generated based on the map data, and the position of the obstacle at the work site which is calculated by the second calculation portion.

5. The construction machine according to claim 4, further comprising a generation portion which generates the plan of the work site based on the map data.

6. The construction machine according to claim 1, further comprising a work state detection portion which detects a work state indicating whether the construction machine is in work or during stop, wherein the storage unit stores the log data further correlating the work state.

7. The construction machine according to claim 1, further comprising a communication unit capable of transmitting the log data to an external apparatus via a network.

8. The construction machine according to claim 1, further comprising a control unit which includes the first calculation portion, and which determines whether or not the obstacle enters a state where the obstacle cannot be detected in the monitoring region based on the detection result obtained by the obstacle detection sensor, and records the log data in time series during a period when the obstacle is present in the monitoring region.

9. The construction machine according to claim 8, wherein during the period when the obstacle is present in the monitoring region, the control unit repeats recording of the log data at a predetermined interval.

10. A construction machine comprising:
a lower travelling body;
an upper slewing body provided on the lower travelling body to be turnable with respect to the lower travelling body;
an obstacle detection sensor which detects presence/absence of an obstacle in a monitoring region set around the construction machine in advance and a distance to the obstacle;
a first calculation portion which calculates first position information including positional coordinates of the obstacle relative to a reference position set in the construction machine in advance based on a detection result obtained by the obstacle detection sensor:
a time information holding portion which has time information for specifying time when the obstacle is detected;
a storage unit which stores low data that correlates the first position information with the time information;
a count portion which counts the number of approaches of the obstacle to the construction machine over a boundary set in advance in the detection region of the obstacle detection sensor, in the detection region of which, the presence/absence of the obstacle and the distance to the obstacle can be detected; and
a warning output unit which outputs warning to an operator of the construction machine when the number of approaches exceeds a threshold value set in advance.

* * * * *